Patented Feb. 12, 1952

2,585,512

UNITED STATES PATENT OFFICE 2,585,512

NONYL AMINE SALTS OF PENICILLIN

Frank W. Staab, Fayetteville, N. Y., assignor to Bristol Laboratories Inc., New York, N. Y., a corporation of New York No Drawing. Application February 9, 1951, Serial No. 210,291

2 Claims. (Cl. 260—239.1)

This invention relates to a new amine salt of penicillin and more particularly to the penicillin salts of nonylamine which, because of their cheapness, relative insolubility and stability are eminently suitable as repository salts, for oral and topical administration and especially for nutritional supplements in animal feeds.

The compounds of this invention have the following formula:

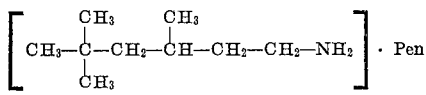 · Pen wherein Pen designates an acid penicillin radical or active moiety thereof.

A better understanding of this invention may be obtained by reference to the following example. The nonylamine D1 referred to is 3,5,5-trimethylhexylamine obtainable from the Rohm and Haas Co.

Example

Forty-five grams of nonylamine D1 were dissolved in 150 ml. of water and neutralized with 25 ml. of concentrated hydrochloric acid and the solution added slowly over 15 minutes with stirring to a solution of 112 grams of potassium penicillin G in 1100 ml. of water. The precipitate formed was filtered and the cake was washed with 300 ml. of tap water. The cake was dried at 90-95° F. overnight. Microscopic examination showed the salt to be crystalline in nature. The water solubility at 29° C. and the dry weight potency was determined. Theoretical potency: 1247 u./mg.

Results:
  Yield _____ 122.5 grams (86%)
  Potency _____ 1180 u./mg.
  Solubility _____ ca. 11,000 u./ml.

While the above example refers particularly to the nonylamine salt of penicillin G, other penicillins are also included within the scope of this invention. Examples of such penicillins are the natural penicillins, such as penicillin G, F, dihydro F, X and K.

I claim:

1. A salt of penicillin and 3,5,5-trimethylhexylamine.

2. A salt of penicillin G and 3,5,5-trimethylhexylamine.

FRANK W. STAAB.

REFERENCES CITED

The following references are of record in the file of this patent:

UNITED STATES PATENTS

| Number | Name | Date |
| --- | --- | --- |
| 2,493,625 | Goldberg et al. | Jan. 3, 1950 |
| 2,527,810 | Goldberg et al. | Oct. 31, 1950 |
| 2,547,640 | Goldman | Apr. 3, 1951 |